(12) United States Patent
Kim et al.

(10) Patent No.: US 9,789,859 B2
(45) Date of Patent: Oct. 17, 2017

(54) RAILWAY VEHICLE BRAKING SYSTEM AND METHOD

(71) Applicant: Korea Railroad Research Institute, Uiwang-Si (KR)

(72) Inventors: Jung Tai Kim, Gyeonggi-do (KR); Jai Sung Hong, Gyeonggi-do (KR); Kyeong Jun Ko, Seoul (KR); Moo Sun Kim, Seoul (KR)

(73) Assignee: Korea Railroad Research Institute, Uiwang-Si (KR)

( * ) Notice: Subject to any disclaimer, the term of this patent is extended or adjusted under 35 U.S.C. 154(b) by 0 days.

(21) Appl. No.: 14/895,871

(22) PCT Filed: Nov. 19, 2014

(86) PCT No.: PCT/KR2014/011116
§ 371 (c)(1),
(2) Date: Dec. 3, 2015

(87) PCT Pub. No.: WO2015/186874
PCT Pub. Date: Dec. 10, 2015

(65) Prior Publication Data
US 2016/0221551 A1  Aug. 4, 2016

(30) Foreign Application Priority Data
Jun. 3, 2014  (KR) .................. 10-2014-0067960

(51) Int. Cl.
*G05D 1/00* (2006.01)
*G05D 3/00* (2006.01)
(Continued)

(52) U.S. Cl.
CPC .......... *B60T 8/1705* (2013.01); *B60T 13/665* (2013.01); *B60T 17/228* (2013.01); *B61H 13/00* (2013.01)

(58) Field of Classification Search
CPC .......... B60T 8/1705; B60T 13/66; B60Q 1/00; G06F 17/00
(Continued)

(56) References Cited

U.S. PATENT DOCUMENTS 4,631,514 A * 12/1986 Fujiwara ................. B60T 15/46
188/112 R
4,744,607 A *  5/1988 Nagata ..................... B60T 8/00
303/16
(Continued)

FOREIGN PATENT DOCUMENTS

JP  08-026110 A   1/1996
JP  2013-184526 A  9/2013
(Continued)

*Primary Examiner* — Mahmoud Ismail
(74) *Attorney, Agent, or Firm* — Wolf, Greenfield & Sacks, P.C.

(57) ABSTRACT

Disclosed are a railway vehicle braking system and method. The railway vehicle braking system includes a braking command generating unit generating a braking command to stop a railway vehicle, a comparison unit determining whether the braking command has been changed, a delay unit delaying and outputting the braking command depending upon a determination result from the comparison unit, and a digital-to-analog converter converting the braking command, which has been delayed by the delay unit, into an analog signal and inputting the analog signal to an actuator.

2 Claims, 4 Drawing Sheets

(51) Int. Cl.
  *G06F 7/00*    (2006.01)
  *G06F 17/00*   (2006.01)
  *B60T 8/17*    (2006.01)
  *B61H 13/00*   (2006.01)
  *B60T 13/66*   (2006.01)
  *B60T 17/22*   (2006.01)
  *B60T 7/12*    (2006.01)
  *B60T 13/74*   (2006.01)

(58) Field of Classification Search
  USPC ............... 701/20, 19; 340/52; 303/16, 3
  See application file for complete search history.

(56) References Cited

U.S. PATENT DOCUMENTS

| | | |
|---|---|---|
| 5,500,799 A | 3/1996 | Balukin et al. |
| 5,535,122 A | 7/1996 | Wood et al. |
| 2004/0193336 A1* | 9/2004 | Sugita .................... B61L 23/14 701/19 |

FOREIGN PATENT DOCUMENTS

| | | |
|---|---|---|
| KR | 1020080094195 A | 10/2008 |
| KR | 20090013156 A | 2/2009 |

\* cited by examiner

RAILWAY VEHICLE BRAKING SYSTEM AND METHOD

CROSS-REFERENCE TO RELATED APPLICATIONS

This application is a national stage filing under 35 U.S.C. §371 of International PCT Application PCT/KR2014/011116, filed on Nov. 19, 2014, which claims the benefit of priority to Korean Patent Application No. 10-2014-0067960, filed on Jun. 3, 2014, each of which applications is incorporated herein by reference to the maximum extent allowable by law.

TECHNICAL FIELD

The present invention relates to a railway vehicle braking system and method, and more particularly, to a railway vehicle braking system and method, which control braking pressure by inputting a braking command to an actuator after delaying the braking command for a predetermined period of time or more when a railway vehicle is to be stopped.

BACKGROUND ART

Generally, railway vehicles travel along rails by power generated from an engine using fuel or electric power supplied from overhead lines. Railway vehicles are also equipped with a braking system for decelerating or stopping the railway vehicles. Since the railway vehicles are typically massive and travel along rails, it is necessary for the braking system to have high reliability.

To this end, braking commands of the railway vehicle denote the designated braking levels which are divided into plural levels (for example 28 levels), and the braking system selects a proper braking command based on the speed and weight of the railway vehicle and performs braking operation according to the selected braking command.

Each braking command is input as a digital signal. Thus, if bit digits of a specific braking command are all changed when the braking command is changed to another one, there is a problem of misrecognizing the corresponding digital signal. Such a problem can cause a sudden drop of braking pressure and deterioration in responsivity and linearity of the braking pressure, so that deceleration of the railway vehicle is sharply changed to cause wobbling of the railway vehicle wobbles, thereby causing deterioration in ride comfort.

One example of a railway vehicle braking system is disclosed in Korean Patent Publication No. 10-2008-0094195 A (Oct. 23, 2008).

Technical Problem

The present invention has been conceived to solve such problems in the art and it is an aspect of the present invention to provide a railway vehicle braking system and method which can prevent sudden change of braking pressure by inputting a braking command to an actuator after delaying the braking command for a predetermined period of time or more when a railway vehicle is to be stopped.

It is another aspect of the present invention to provide a railway vehicle braking system and method which can secure responsivity and linearity of braking pressure by preventing sudden change of the braking pressure due to change of a braking command.

It is a further aspect of the present invention to provide a railway vehicle braking system and method which can improve ride comfort by preventing wobbling of a railway vehicle during braking operation.

Technical Solution

In accordance with an aspect of the present invention, a railway vehicle braking system includes: a braking command generating unit generating a braking command to stop a railway vehicle; a comparison unit determining whether the braking command has been changed; a delay unit delaying and outputting the braking command depending upon a determination result from the comparison unit; and a digital-to-analog converter converting the braking command, which has been delayed by the delay unit, into an analog signal and inputting the analog signal to an actuator.

Upon determining that the braking command has been changed, the delay unit may delay the braking command.

The delay unit may delay the braking command for a predetermined period of time or more.

The delay unit may output the braking command in synchronization with a falling edge or a rising edge of a clock signal immediately after the predetermined period of time has elapsed from change of the braking command.

When a predetermined braking condition is satisfied, the braking command generating unit may generate the braking command using at least one of a weight and a speed of the railway vehicle.

In accordance with another aspect of the present invention, a railway vehicle braking method includes: generating a braking command to stop a railway vehicle; determining whether the braking command has been changed; delaying and outputting the braking command depending upon a determination result; and converting the delayed braking command into an analog signal and inputting the analog signal to an actuator.

The delaying and outputting the braking command may include delaying the braking command upon determining that the braking command has been changed.

The delaying and outputting the braking command may include delaying the braking command for a predetermined period of time or more.

The delaying and outputting the braking command may include outputting the braking command in synchronization with a falling edge or a rising edge of a clock signal immediately after the predetermined period of time has elapsed from change of the braking command.

The generating a braking command to stop a railway vehicle may include generating the braking command using at least one of a weight and a speed of the railway vehicle when a predetermined braking condition is satisfied.

Advantageous Effects

As described above, the present invention provides a railway vehicle braking system and method, which can prevent sudden change of braking pressure and can secure responsivity and linearity of the braking pressure by inputting a braking command to an actuator after delaying the braking command for a predetermined period of time or more when the braking command is changed.

Further, the present invention provides a railway vehicle braking system and method, which can improve ride comfort by preventing wobbling of a railway vehicle during the braking operation.

DETAILED DESCRIPTION

Hereinafter, embodiments of the present invention will be described in detail with reference to the accompanying drawings. It should be understood that the drawings are not to precise scale and may be exaggerated in thickness of lines or size of components for descriptive convenience and clarity only. In addition, the terms used herein are defined by taking functions of the present invention into account and can be changed according to user or operator custom or intention. Therefore, definition of the terms should be made according to the overall disclosure set forth herein.

Figure 1:
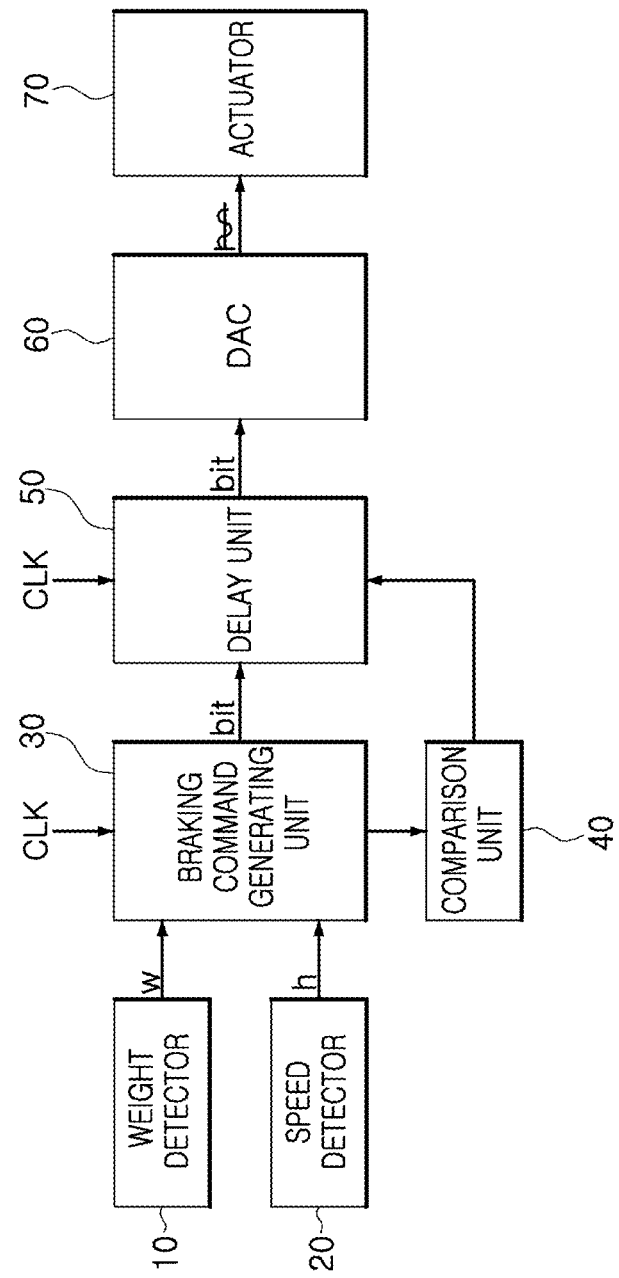
FIG. 1 is a block diagram of a railway vehicle braking system according to one embodiment of the present invention.
Figure 2:
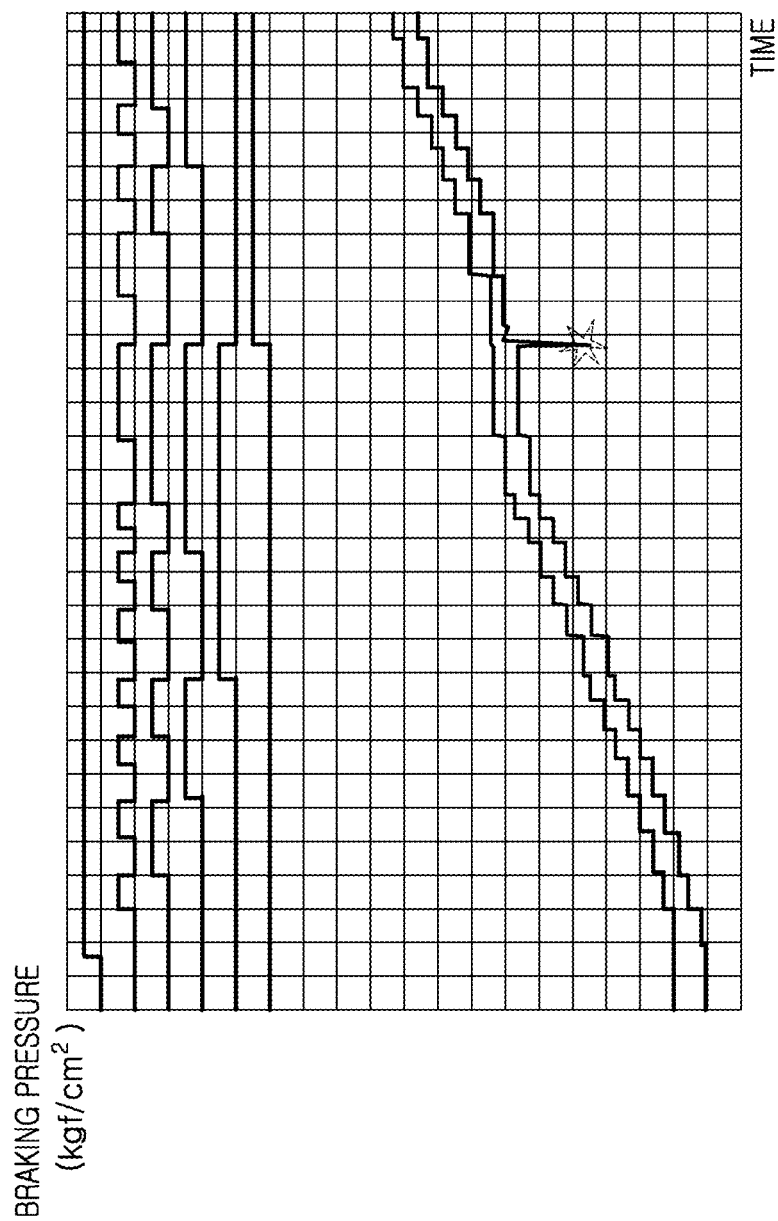
FIG. 2 is a graph showing change of braking pressure with respect to time.
Figure 3:
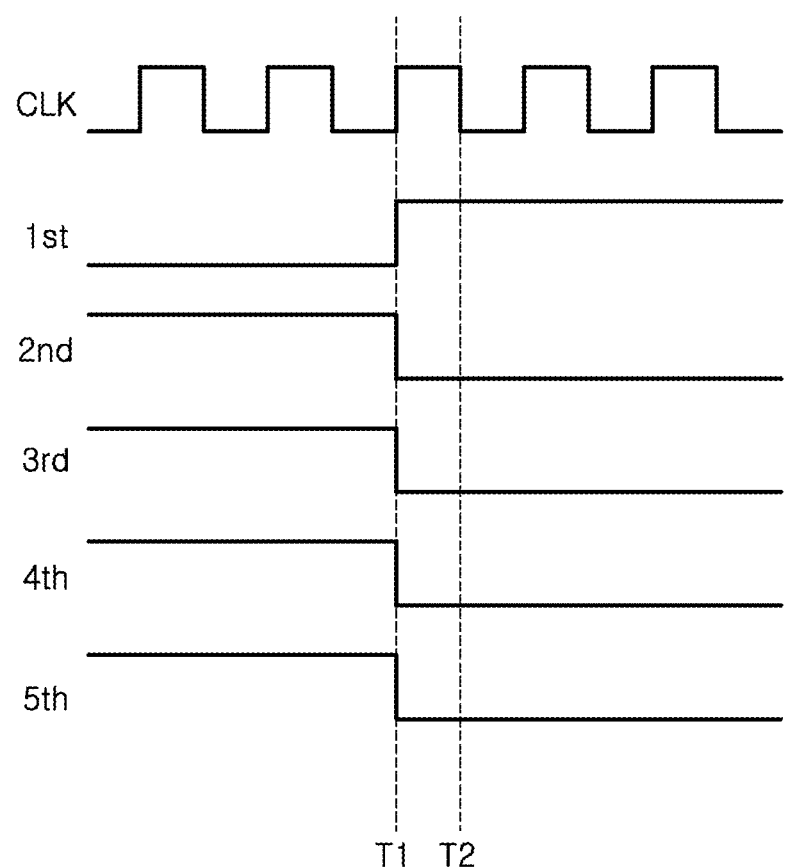
FIG. 3 is a timing diagram showing change of a braking command according to one embodiment of the present invention.

FIG. 1 is a block diagram of a railway vehicle braking system according to one embodiment of the present invention, FIG. 2 is a graph showing change of braking pressure with respect to time, and FIG. 3 is a timing diagram showing change of a braking command according to one embodiment of the present invention.

Referring to FIG. 1, a railway vehicle braking system according to one embodiment of the present invention includes a weight detector 10, a speed detector 20, a braking command generating unit 30, a comparison unit 40, a delay unit 50, a digital-to-analog converter (DAC) 60, and an actuator 70.

The weight detector 10 serves to detect the weight of the railway vehicle. Weight of passengers and cargo as well as weight of the railway vehicle body may be included in the weight of the railway vehicle. Herein, since the weight detector 10 for detecting the weight of the railway vehicle can be easily realized by those skilled in the art, detailed descriptions thereof will be omitted.

The speed detector 20 serves to detect the speed of the railway vehicle. The speed detector 20 may include a global positioning system (GPS), which determines a position of the railway vehicle using navigation signals from GPS satellites, and a vehicle wheel speed sensor, which determines the speed of the railway vehicle by sensing the rpm of the wheels of the railway vehicle. Herein, since the speed detector 20 for detecting the speed of the railway vehicle can be easily realized by those skilled in the art, detailed descriptions thereof will be omitted.

The braking command generating unit 30 serves to determine whether the traveling state satisfies a predetermined braking condition while the railway vehicle is traveling, and upon determining that the traveling state of the railway vehicle satisfies the predetermined braking condition, the braking command generating unit 30 generates a braking command, which is a digital signal, using at least one of the weight and the speed of the railway vehicle that are transmitted from the weight detector 10 and the speed detector 20, respectively. In other words, the braking command is generated based on at least one of the weight and the speed of the railway vehicle that are detected by the weight detector 10 and the speed detector 20, whereby the braking command can be diversely determined depending upon change of the total weight of the railway vehicle due to increase or decrease of passengers and cargo and change of the speed of the railway vehicle.

The braking condition may include driver manipulation of a brake lever, a situation in which the railway vehicle must be stopped, for example, an emergency situation, and any various other conditions in which the railway vehicle must be stopped.

Herein, the braking command is provided in plural according to the traveling environment, the weight and the speed of the railway vehicle, each of which is generated as a digital signal corresponding thereto. Furthermore, each braking command has a predetermined braking pressure, and each braking pressure is generated by the actuator 70 and acts to stop the railway vehicle, which will be described below.

This embodiment will be described based on the case where the braking commands are classified into plural commands (for example, 28 commands) and the digital signals of the braking commands are realized as 5-bit codes, from 00001 (which corresponds to "1") to 11100 (which corresponds to "28").

However, it should be understood that the present invention is not limited thereto, and that various numbers of braking commands can be used. In this case, the digital signals can be represented by proper bit numbers according to the number of braking commands.

When a braking command is generated from the braking command generating unit 30, the comparison unit 40 compares the currently braking command with a previously braking command, determines whether the braking command has been changed, and inputs the determination result to the delay unit 50.

Based on the braking command generated from the braking command generating unit 30 according to the braking condition and the determination result from the comparison unit 40, the delay unit 50 delays the braking command for a predetermined period of time or more.

Although the predetermined period of time may be set to be one half-cycle of a clock signal in this embodiment, it should be understood that the predetermined period of time may be diversely set within a range capable of minimizing deterioration in responsivity and linearity of braking pressure due to the braking command delay.

That is, when the comparison unit 40 determines that the braking command has been changed, the delay unit 50 delays the braking command from the braking command generating unit 30 for the predetermined period of time or more. This will be described with reference to FIGS. 2 and 3.

An exemplary graph showing change of the braking pressure with respect to time is shown in FIG. 2. It can be seen from FIG. 2 that braking pressure is changed substantially linearly with respect to time. However, it can also be seen that linearity is deteriorated when the braking command is changed from "15" to "16".

When the braking command is "15", the digital signal is "01111", and when the braking command is "16", the digital signal is "10000". This shows that the bit numbers are significantly changed as compared with other changes of the braking command. As such, when the braking command is changed from "15" to "16", the first digit "0" of "01111" is changed to "1" and all of the second to fifth digits "1" of "01111" are changed to "0", and in this process, there can be a problem that the braking command generating unit 30 misrecognizes the braking command as "00000" and outputs the same. As a result, the braking command is sharply changed and the braking pressure is also suddenly changed corresponding to change of the braking command, thereby causing deterioration in responsivity and linearity of the braking pressure and degradation of ride comfort.

The delay unit 50 delays the braking command generated from the braking command generating unit 30 for a predetermined period of time or more based on the clock signal and then inputs the braking command to the actuator 70, thereby allowing an accurate braking command to be input to the actuator 70 after the predetermined period of time has elapsed from the change of the braking command. That is, the delay unit 50 may be configured to output the braking command in synchronization with a falling edge or a rising edge of the clock signal immediately after the predetermined period of time has elapsed from the change of the braking command.

That is, referring to FIG. 3, when the braking command is changed from "15" to "16", the digital signal is changed from "01111" to "10000" at T1. Thus, the delay unit 50 delays the braking command for a predetermined period of time or more after the change of the braking command. When the predetermined period of time is set to be one half-cycle of the clock signal, the delay unit 50 inputs a digital signal, which corresponds to the falling edge at which the half-cycle of the clock signal has elapsed from T1, to the actuator 70. Here, the predetermined period of time is a time interval between T2 and T1.

As a result, when the braking command is changed at the rising edge of the clock signal, the delay unit 50 inputs a braking command, which corresponds to the next first falling edge after the change of the braking command, i.e. a time point after the half-cycle of the clock signal has elapsed, to the actuator 70.

Conversely, when the braking command is changed at the falling edge of the clock signal, the delay unit 50 inputs a braking command, which corresponds to the next first rising edge after the change of the braking command, i.e. a time point after the half-cycle of the clock signal has elapsed, to the actuator 70.

In the case where the predetermined period of time is set to be one cycle of the clock signal, when the braking command is changed at the rising edge of the clock signal, the delay unit 50 inputs a braking command, which corresponds to the next first rising edge after the change of the braking command, to the actuator 70, and when the braking command is changed at the falling edge of the clock signal, the delay unit 50 inputs a braking command, which corresponds to the next first falling edge after the change of the braking command, to the actuator 70.

The DAC 60 serves to convert the braking command, which is a digital signal transmitted from the delay unit 50, into an analog signal.

The actuator 70 operates a brake (not shown) depending upon the braking command, which has been converted into an analog signal by the DAC 60, thereby stopping the railway vehicle. The actuator 70 may include a motor for forcibly generating the braking pressure. Herein, the railway vehicle braking system may be operated by either pneumatic pressure or hydraulic pressure. Therefore, depending upon the type of braking system, either a motor for generating pneumatic pressure or a motor for generating hydraulic pressure may be adopted. In addition, the brake may include various devices to forcibly brake the wheels of the railway vehicle using the hydraulic pressure generated from the actuator 70.

Hereinafter, a railway vehicle braking method according to one embodiment of the present invention will be described in detail with reference to FIG. 4.

Figure 4:
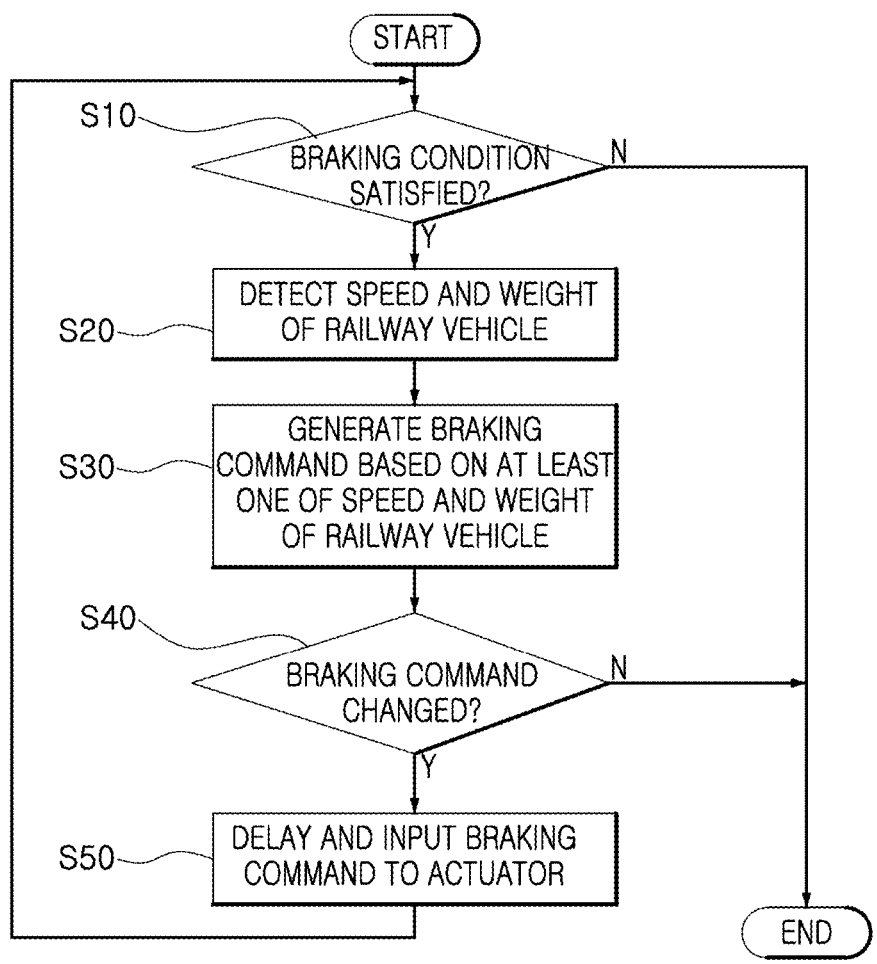
FIG. 4 is a flowchart of a railway vehicle braking method according to one embodiment of the present invention.

FIG. 4 is a flowchart of a railway vehicle braking method according to one embodiment of the present invention.

Referring to FIG. 4, while the railway vehicle is traveling, the braking command generating unit 30 determines whether the traveling state satisfies a predetermined braking condition, including driver manipulation of a brake lever or a situation in which the railway vehicle must be stopped, for example, an emergency situation (S10).

Upon determining that the braking condition is satisfied at step S10, the braking command generating unit 30 detects the speed and the weight of the railway vehicle through the speed detector 20 and the weight detector 10 (S20), and generates a braking command, which is a digital signal, based on at least one of the speed and the weight of the railway vehicle that are detected by the speed detector 20 and the weight detector 10 (S30).

At this time, the braking command generating unit 30 generates a predetermined braking command depending upon the characteristics, the weight, the speed, etc. of the railway vehicle.

When the braking command is generated from the braking command generating unit 30, the comparison unit 40 determines whether the braking command has been changed by comparing the current braking command with the previous braking command (S40).

Upon determining that the braking command has been changed at step S40, the delay unit 50 delays the braking command transmitted from the braking command generating unit 30 for a predetermined period of time or more, and inputs the braking command to the actuator 70 (S50).

Herein, the predetermined period of time may be set to be one cycle or less of the clock signal. By way of example, when the predetermined period of time is set to be one half-cycle of the clock signal, the delay unit 50 inputs a braking command, which corresponds to a time point after the half-cycle of the clock signal has elapsed, to the actuator 70 through the DAC 60.

That is, when the braking command is changed at the rising edge of the clock signal, the delay unit 50 inputs a braking command, which corresponds to the next first falling edge after the change of the braking command, to the DAC 60, and when the braking command is changed at the falling edge of the clock signal, the delay unit 50 inputs a braking command, which corresponds to the next first rising edge after the change of the braking command, to the DAC 60.

The DAC 60 converts the braking command, which has been delayed by the delay unit 50, into an analog signal, and inputs the braking command, which has been converted into the analog signal, to the actuator 70.

As the braking command, which has been converted into the analog signal by the DAC 60, is input, the actuator 70 operates the brake to generate a braking pressure corresponding to the braking command input thereto, thereby stopping the railway vehicle.

In the above embodiment, it has been described that the braking command is delayed whenever the braking command is changed. However, it should be understood that the present invention is not limited thereto and that the braking command may be selectively delayed only when a predetermined braking command is changed. In other words, the railway vehicle braking method according to the embodiment of the invention can also be selectively applied to a situation in which the braking command is sharply changed.

For example, as shown in FIGS. 2 and 3, only when the braking command is changed from "15" to "16", i.e. from "01111" to "10000", the comparison unit 40 may input the determination result to the delay unit 50, and thus the delay unit 50 may delay the corresponding braking command. That is, in the case of any other changes of the braking command, the braking command is not delayed. As a result, the braking command can be transmitted more rapidly than that in the above-described embodiment.

As described above, the present invention provides a railway vehicle braking system and method, which can delay a braking command when the braking command is changed, thereby preventing sudden change of braking pressure while securing responsivity and linearity of the braking pressure.

Further, the present invention provides a railway vehicle braking system and method, which can prevent wobbling of the railway vehicle during the braking operation, thereby improving ride comfort.

Although some embodiments have been disclosed above, it should be understood that these embodiments are given by way of illustration only, and that various modifications, variations, and alterations can be made without departing from the spirit and scope of the present invention. Therefore, the scope of the present invention should be limited only by the accompanying claims.

The invention claimed is:

1. A railway vehicle braking method performed by a railway vehicle braking system, comprising:
   generating a digital braking command signal to stop a railway vehicle based on at least one of a weight and a speed of the railway vehicle, wherein the digital braking command signal is a code signal with a predetermined number of bits;
   comparing a currently generated digital braking command signal with a previously generated digital braking command signal by checking the bits of the digital braking command signal to determine whether the digital braking command signal has been changed;
   delaying and outputting the digital braking command signal depending upon a determination result; and
   converting the delayed digital braking command signal into an analog signal and inputting the analog signal to an actuator,
   wherein the digital braking command signal is selectively delayed only when a predetermined change of the digital braking command signal occurs in terms of values of the bits,
   wherein the delaying and outputting the digital braking command signal comprises delaying the digital braking command signal for a predetermined period of time or more,
   wherein the delaying and outputting the digital braking command signal comprises outputting the digital braking command signal in synchronization with a falling edge or a rising edge of a clock signal immediately after the predetermined period of time has elapsed from change of the digital braking command signal.

2. The railway vehicle braking method according to claim 1, wherein the generating a digital braking command signal to stop a railway vehicle comprises generating the digital braking command signal when a predetermined braking condition is satisfied.

* * * * *